United States Patent [19]
Gladstein

[11] 3,854,242
[45] Dec. 17, 1974

[54] SUPPORT STRUCTURE FOR A RECEPTACLE OR THE LIKE

[76] Inventor: Alan Gladstein, 8210 Clinton Ave., Los Angeles, Calif. 90048

[22] Filed: July 25, 1973

[21] Appl. No.: 382,576

[52] U.S. Cl. .................... 47/35, 248/318, D35/3 C
[51] Int. Cl. .......................... A47g 7/00, A01g 9/04
[58] Field of Search ............ 248/318; 47/35; D35/3

[56] References Cited
UNITED STATES PATENTS

| | | |
|---|---|---|
| 941,448 | 11/1909 | Haglund ............................. 248/318 |
| 1,095,504 | 5/1914 | Jannock ................................. 47/35 |
| 3,081,058 | 3/1963 | DeVries et al. ..................... 248/318 |
| 3,136,522 | 6/1964 | Calderone ........................... 248/318 |
| D160,781 | 11/1950 | Glese .................................. D35/35 |

Primary Examiner—Robert E. Bagwill
Attorney, Agent, or Firm—Francis X. Lo Jacono

[57] ABSTRACT

A support structure for various types of receptacles or the like comprising a plurality of securing hooks having a substantially "S"-shaped configuration for removably attaching to a first hanging structure, the lower portion of the hooks being adapted to receive eye members of a pair of supporting cords. Each of the cords hangs downwardly therefrom and is threaded through apertures disposed within a base plate wherein the base plate is centrally positioned directly below the first hanging structure, whereby a receptacle is disposed between the supporting cords resting on the base plate to provide a means by which any fluid overflow deposited in the first hanging structure is caught and retained in the supported receptacle.

2 Claims, 7 Drawing Figures

PATENTED DEC 17 1974
3,854,242
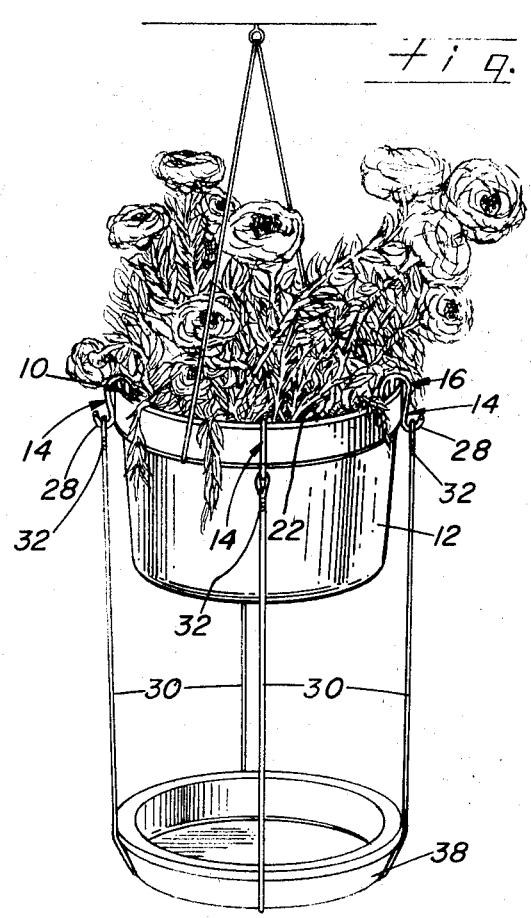
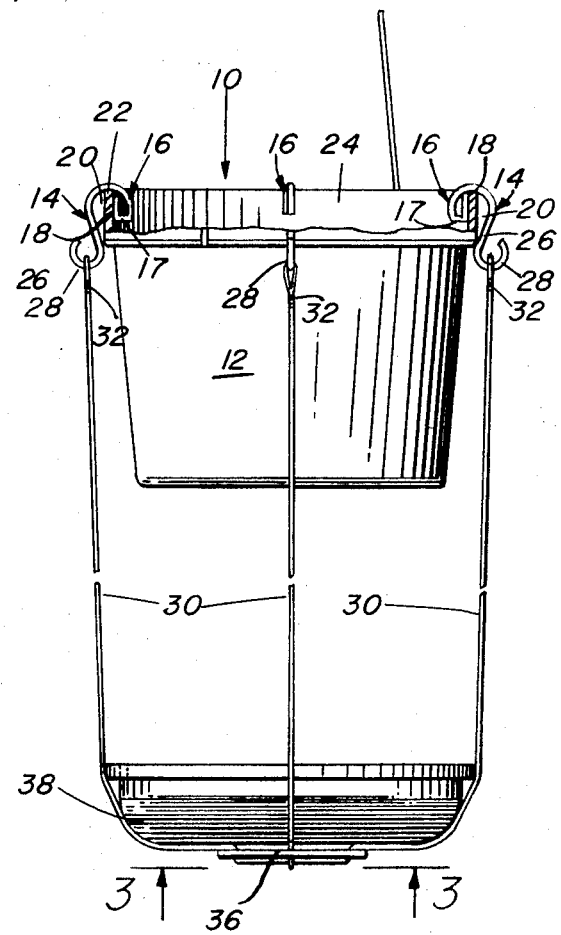
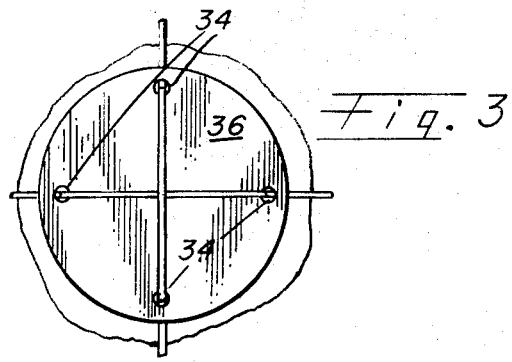
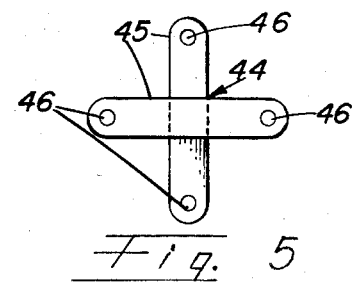
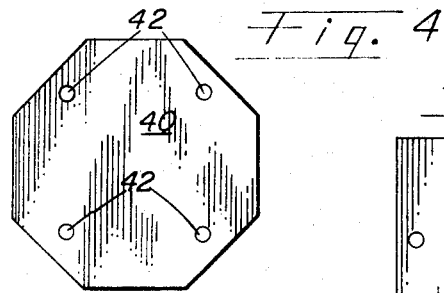
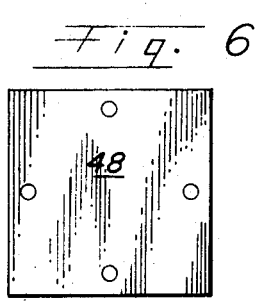
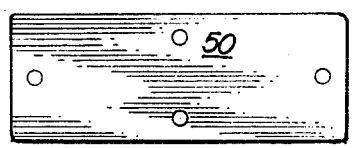

SUPPORT STRUCTURE FOR A RECEPTACLE OR THE LIKE

BACKGROUND

1. Field of the Invention

This invention relates generally to a hanging support structure and, more particularly, to a hanging support structure for attaching to a flower pot which is suspended above the ground level, said structure having supported therein a receptacle aligned directly under the flower pot to provide a catch for overflow of water dripping therefrom.

2. Description of the Prior Art

Due to an increase in desire to provide natural home decorations, live plants and flowers are presently in display more frequently than ever before. However, with the growing of such live plants and flowers, problems have arisen with respect to their proper watering. One of these watering problems is very often presented with respect to the well known hanging potted plant. When this type of plant is hung indoors, as is now very often done, precise watering is difficult, particularly since some of the pots are hung above eye level and are at heights which are hard to reach without the aid of a stool or ladder. Therefore, an overflow can very easily occur during watering, thereby causing water to drip over the edge of the pot. At the present time, to the applicant's knowledge, there is no satisfactory means to prevent the water from dripping onto the floor or furniture disposed nearby. Thus, the following disclosure by the applicant will present an answer to the water-overflow problem with hanging plants, as well as adding an appealing decorative mode.

SUMMARY

The present invention comprises a plurality of removable hooks having a substantially "S"-shaped configuration, said hooks being designed to be secured about the annular edge of a flower pot, the flower pot being the type that is hung overhead and supports a living plant therein.

Attached to the lower portion of the hook are a pair of cords, each being provided at its opposite free end with an eyelet or loophole. Before being attached by the eyelets to the hook, the cords are threaded through apertures provided in a base plate. After the hooks, cords and base plate are all positioned below the flower pot, a receptacle is disposed within the cords and supported on the base plate. Thus, when the plant is watered and overflow occurs, the dripping water will be caught in the lower supported receptacle without damage to the floor, rug or furniture.

OBJECTS AND ADVANTAGES

It is an object of the invention to provide a support means for a receptacle wherein said receptacle can be easily supported directly under a hanging flowerpot in order to receive the overflow of water when said flower pot is watered.

It is another object of the invention to provide a support means of this character wherein various sizes of receptacles can be used as desired.

Still another object of the invention is to provide a support means of this character wherein the hook members are readily removable, and wherein the upper portion thereof is provided with a positioning means for firm attachment to the various thicknesses of flower pot walls.

A further object of the present invention is to provide an apparatus of this character wherein only two cords are required, each being adapted with eyelets at its opposite end for improved stability.

Another object of the invention is to provide a support structure of this character that has a minimum of parts and is relatively inexpensive to manufacture.

A still further object of the invention is to provide a support structure of this character that is simple and rugged in construction.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a perspective view of the invention shown attached to a hanging flower pot;

FIG. 2 is a side-elevational view wherein parts are broken away to provide a more clear illustration of the hook means;

FIG. 3 is an enlarged view taken substantially on line 3 — 3 of FIG. 2 in the direction of the arrows, showing one form of the base plate;

FIG. 4 is a plan view of an alternative arrangement of the base plate; and

FIGS. 5, 6 and 7 are, also, plan views of various alternative designs of the base plate.

DESCRIPTION OF THE PREFERRED EMBODIMENT

Referring to the drawings, there is disclosed a support structure for a receptacle, or the like, which is adapted to be removably attached to a first hanging structure, generally indicated at 10. The present invention is particularly suitable for use in combination with hanging flower pots, such as indicated at 12 and illustrated in FIGS. 1 and 2. Generally, the flower pots are hung from an overhead structure, either outdoors or indoors, and are positioned at a height just above eye level. Thus, watering of the plants within the pots becomes a problem in that very often an excess of water will cause an overflow and dripping occurs. In order to prevent damage from the water dripping therefrom, the present invention is used to catch the overflow.

Hence, the present invention comprises a plurality of hook-attaching attaching means, said hook means being formed in a substantially "S"-shaped configuration, as generally indicated at 14. The upper semi-circular portion 15 of hook 14 is provided at its free end with a brace member 16 formed as an integral part of the hook, wherein the end thereof is bent inwardly as at 17 and then upwardly at 18, thus forming a restricted opening 20 in which the peripheral edge 22 of the pot 12 is received therein. Thus, it can be seen in FIG. 2 that a more positive contact is created with the pot 12, wherein the bent member 18 engages the inner annular wall 24; and the intermediate portion 26 of the hook firmly contacts the outer annular wall of the pot.

The lower semi-circular member 28 forms the lower portion of the hook 14.

There are also provided a plurality of elongated cords or string-like members 30 which are adapted with eyelets or loopholes 32 at each free end thereof. These eyelets 32 are demountably disposed over the lower member 28 of hook 14. Before the eyelets 32 are attached over the oppositely disposed hooks, the string or cord 30 is passed through apertures 32 disposed in a base plate 36. (See FIG. 3.) It is contemplated that the preferred number of hooks would be two sets each — that is, four individual hooks being spaced equally about the peripheral edge 22.

The cords 30 are each threaded through oppositely disposed apertures 34 in such a manner that said cords cross each other at their intermediate points, to provide a very stable and balanced support structure. (See FIG. 3.)

Eyelets 32 are then hooked over the lower portion 28 of the hooks wherein one eyelet of a particular cord is hooked to the directly opposed hook member, thereby providing four symmetrically-spaced depending lines, with the base plate 36 centrally disposed below the flower pot 12.

As illustrated in FIGS. 1 and 2, there is demountably received within the cord structure a receptacle 38. This receptacle can be of any desired style or design. However, the receptacle is required to have a diameter large enough to allow for complete coverage of the flower pot disposed above so that all water dripping from said pot is readily caught by said receptacle.

At present, the preferred form of the base plate is a circular type, as seen in FIG. 3. However, other shapes and configurations are contemplated, such as shown in the remaining figures.

Hence, base plate 40, as illustrated in FIG. 4, is designed with six equal sides, including the four symmetrically arranged apertures 42.

FIG. 5 illustrates a base plate 44 defined by a pair of elongated members 45, each having oppositely disposed apertures 46, said members being arranged to form a cross design.

The base plate 48 of FIG. 6 is provided with four equal sides, forming a square, while base plate 50 of FIG. 7 forms an elongated rectangle.

Thus, it can be understood that the base plate can be designed in various configurations without departing from the intent of the invention.

The invention and its attendant advantages will be understood from the foregoing description and it will be apparent that various changes may be made in the form, construction and arrangement of the parts of the invention without departing from the spirit and scope thereof, or sacrificing its material advantages, the arrangements hereinbefore described being merely by way of example, and I do not wish to be restricted to the specific forms shown or uses mentioned, except as defined in the accompanying claims.

I claim:

1. A support structure for a receptacle being attachable to a hanging flower pot having an upper, enlarged, open end and a lower end, said support structure comprising:

a plurality of hook-attaching means for removably securing to said hanging flower pot, said hook-attaching means comprising:

a brace member defined by an upper semi-circular member formed as an integral part of said hook-attaching means and having a free end extending inwardly of the semi-circular member and then upwardly, to provide a restrictive opening therein for attaching said hook-attaching means to said upper, enlarged, open end of said flower pot;

an intermediate member; and a lower semi-circular member, wherein said upper semi-circular member, said intermediate member, and said lower semi-circular member are integrally formed in a substantially "S"-shaped configuration;

a plurality of predetermined lengths of cords having terminating free ends;

an eyelet formed in each free end of said cords, whereby said cords are hooked to said lower semi-circular member of said hook-attaching means, said cords depending from said hook-attaching means and forming a loop under said hanging flower pot; and a base plate having a plurality of apertures through which said cords are threaded, said base plate being centrally positioned below said flower pot and intermediate the free ends of said cords.

2. A support structure as recited in claim 1, wherein said plurality of cords comprise a pair of cords having each eyelet of each cord attached to oppositely positioned hook-attaching means, said attaching means being equally spaced about said upper, enlarged, open end of said hanging flower pot, whereby said cords cross in the center of each other, to provide diametrically opposed cord ends.

* * * * *